Dec. 15, 1953 A. G. BALLARD ET AL 2,662,597
MEANS FOR SEVERING OR SEVERING AND CONVEYING
LENGTHS OF WIRE OR SIMILAR STOCK
Filed April 18, 1950 2 Sheets-Sheet 1

INVENTORS
Alfred George Ballard.
William Carlyle Dent.
Dennis George Broscomb.
Alexander Basil Watt.
BY Richardson David & Nordon
their AGENTS Dec. 15, 1953 A. G. BALLARD ET AL 2,662,597
MEANS FOR SEVERING OR SEVERING AND CONVEYING
LENGTHS OF WIRE OR SIMILAR STOCK
Filed April 18, 1950 2 Sheets-Sheet 2
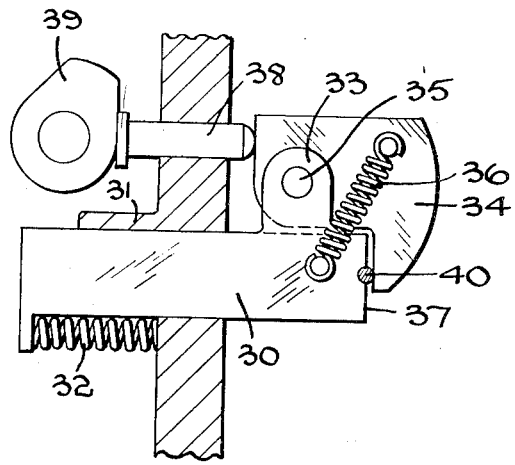
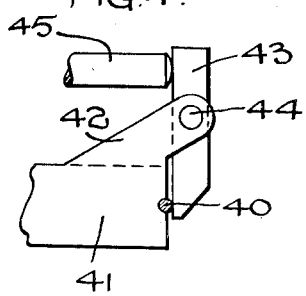
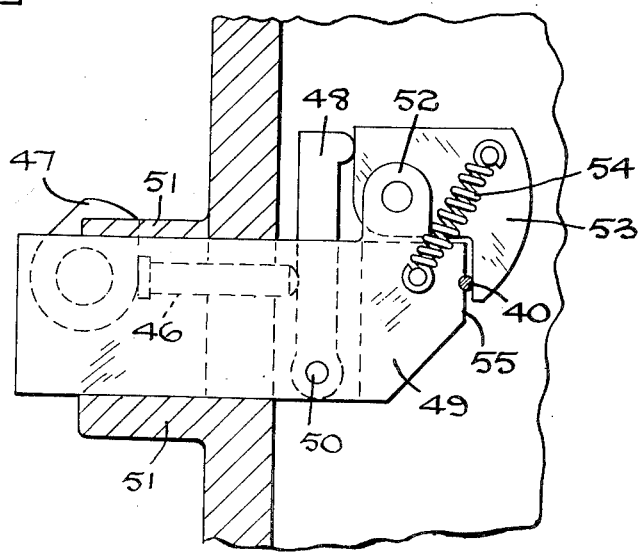
INVENTORS
Alfred George Ballard.
William Carlyle Dent.
Dennis George Broscomb.
Alexander Basil Watt.
BY Richardson David & Nordon
their AGENTS Patented Dec. 15, 1953

2,662,597

UNITED STATES PATENT OFFICE

2,662,597

MEANS FOR SEVERING OR SEVERING AND CONVEYING LENGTHS OF WIRE OR SIMILAR STOCK

Alfred George Ballard, William Carlyle Dent, Dennis George Broscomb, and Alexander Basil Watt, Smethwick, England, assignors to G. K. N. Group Services Limited, Smethwick, England, a British company Application April 18, 1950, Serial No. 156,532

6 Claims. (Cl. 164—41)

This invention relates to improved means for severing or severing and conveying lengths of wire or similar stock and refers to that kind of machine in which stock is fed through a die and lengths are sheared off by a cutter moving near the face of the die. It has been found in practice in machines of this kind that the portion of the stock which protrudes from the die is usually bent by the cutter before severing is effected and consequently the end face of the severed piece of stock is disposed in a plane which is oblique in relation to the length of the stock. The invention is commonly used in connection with heading machines in which the end of the severed blank is subsequently acted upon by a heading punch moving axially and when the end of the work is not at right angles to the length of the work undesirable stresses are set up on the heading die and imperfect heads and tails are sometimes formed.

The object of the present invention is to provide an improved construction.

According to the present invention the severing means comprise a cutter mounted for movement in a plane at right angles to the length of the work, a supporting member movably mounted on the cutter and adapted to engage the work at a position opposite to the position at which it is engaged by the cutter so as to prevent the work from being bent when it is engaged by the cutter, and operating means acting on the support and causing it to move relatively to the cutter so as to press against one side of the work, said operating means then causing the cutter and support to move together so as to sever the work and if desired, to transfer the work to a fresh position for a further operation.

The cutter may be pivoted to a plate or block in which the die through which the stock is fed is mounted, or the cutter may slide in guides, the cutter being adapted to move across the end of the said die and having a semi-circular or part-circular recess which is adapted to engage one side of the work, this cutter if pivoted, being pivotally mounted on an axis which is parallel to the length of the work and spaced from the axis of the work and the supporting member may consist of a plate pivotally mounted on the cutter on an axis which is parallel to the axis of the work and disposed at the opposite side of the work from that where the pivotal axis of the cutter is situated, the supporting member engaging the work at the opposite side to that which is engaged by the cutter and directly opposite thereto, and the operating means may consist of a reciprocating plunger mounted in a suitable bearing and adapted to engage the supporting member at a suitable position to cause it to turn the supporting member on its pivot so as to bring its work engaging edge into engagement with the side of the work which is opposite to the side engaged by the cutter, after which the operating member turns the supporting member and cutter together without relative movement between them and about the axis of the cutter so as to effect the severing action of the protruding piece of the work. The movement may be continued so that the cutter and supporting member carry the severed piece of work to a new position opposite to a further die where the work may be released by the cutter and supporting member and pushed into the said further die.

The supporting member may be spring loaded in a manner tending to move the edge of the supporting member which is to engage the work towards the cutter and the return movement of the cutter and supporting member may also be effected by a spring. The work engaging edge of the supporting member may have a part circular recess for engaging around the work.

Instead of mounting the cutter pivotally, the cutter may be mounted for rectilinear reciprocation in guides and in such an arrangement the supporting member may be pivoted to a lug on the cutter and the device may be actuated by means of a reciprocating plunger acting upon the supporting member.

In another arrangement the cutter may be mounted for rectilinear reciprocating motion and an intermediate lever may be provided pivoted to the cutter at one end and having its other end acting upon the supporting member.

In this latter arrangement the operating means may be in the form of a plunger acting along the centre line of the sliding cutter.

Referring to the drawings:

Figure 3 shows an alternative form of the invention having a sliding cutter.

Figure 4 shows a modification of the form shown in Figure 3.

Figure 5 shows another form of the invention having a sliding cutter.

Figure 1:
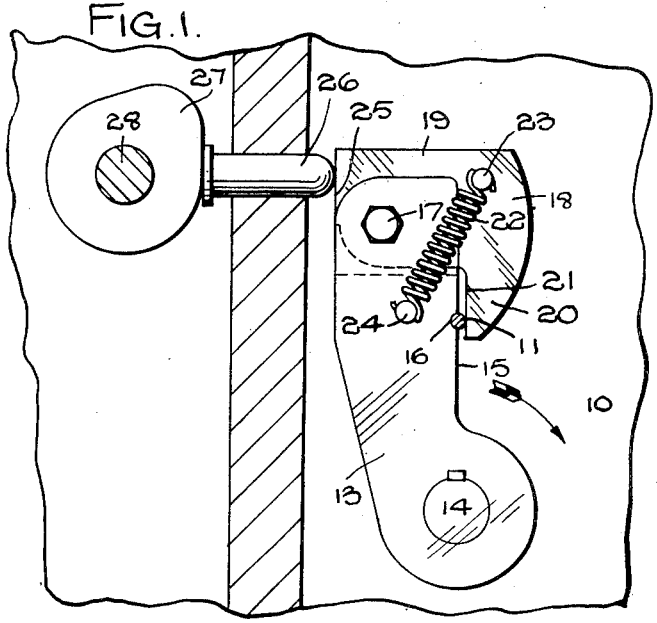
Figure 1 is an end on view of one form of the invention.
Figure 2:
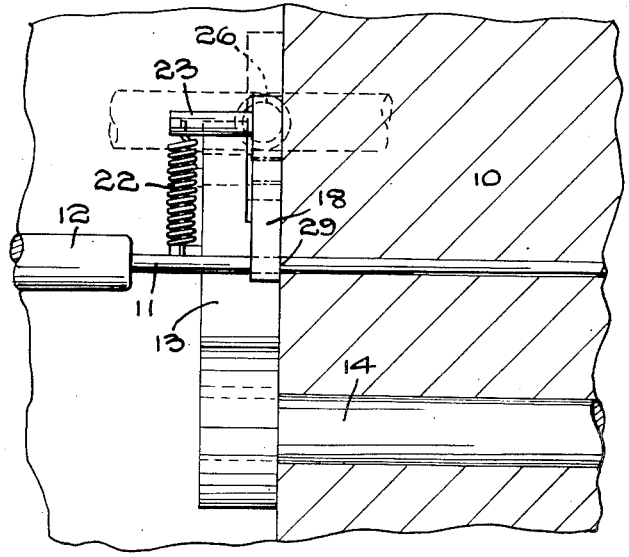
Figure 2 is a view in side elevation of the form shown in Figure 1.

In the construction shown in Figure 1 and 2 of the drawings, the die through which the stock 11 is fed is mounted in a block generally indicated at 10, the end of the die being flush with the block. An adjustable stop 12 is provided against which the stock 11 is fed, the feeding motion of the stock being arrested when the end of the stock engages the stop leaving the required length of stock protruding from the end of the die.

Pivotally mounted on the block 10 carrying the die is the cutter 13. This cutter is fixed on a shaft 14 parallel to the axis of the die and at a position spaced below it, the shaft 14 being pivotally supported in the block 10. The shearing edge 15 of the cutter 13 is disposed radially in relation to the pivotal axis of the shaft 14 upon which the cutter 13 is mounted and the shearing edge 15 is provided with a semi-circular recess at 16 so that the cutter engages halfway around the work. The cutter 13 projects above the work 11 and near its upper end there is pivoted to it at 17 the supporting member 18. This pivot 17 is also parallel to the axis of the work and as seen in Figure 1 it is situated above the work 11 and to one side of a line connecting the pivotal axis of the cutter and the axis of the work.

The supporting member 18 is in the form of a plate of approximately L shape having a horizontal limb 19 and a vertical limb 20 at one end. That edge 21 of the vertical limb 20 which is disposed towards the edge 15 of the cutter may be provided with a part circular recess for engaging the side of the work which is opposite to the side which is engaged by the cutter.

The plate forming the supporting member 18 is acted upon by a spring 22 which tends to move the supporting member into a work engaging position. This spring extends between pegs 23 and 24 on the member 18 and the cutter respectively. The support can however be turned on its pivot so as to bring the edge of its vertical limb away from the work.

The plate forming the supporting member 18 is provided at the end of its horizontal limb 19 at the top with a surface 25 upon which an operating member acts.

The operating member is formed as a power driven plunger 26 operating upon this surface 25 of the supporting member and the operating member first causes the supporting member to exert a force upon the work which is directly opposed to the force which will be applied to the work by the cutter 13. The plunger 26 is operated by a cam 27 on a camshaft 28. When the operating member makes its working stroke the supporting member and cutter grip the work between them adjacent to the end of the die and then they move together to shear the work at a position 29 situated at the end of the die and they may also convey the severed work piece to a position which is directly opposite to a second die where the work is released and pushed into the second die for the next operation.

The shaft 14 may be turned by suitable drive mechanism to carry the severed blank across but the actual severing operation is performed by the movement of the operating member alone.

In the construction shown in Figure 3, the cutter 30 is mounted for reciprocation in fixed guides 31 and in this arrangement a spring 32 is shown for providing the return movement of the cutter. A similar arrangement of spring may be used for the return movement in the constructions hereinafter described.

The cutter on its upper side is provided with an upwardly projecting lug 33 to which is pivoted at 35 the supporting member 34. A spring 36 is provided acting between the cutter and the supporting member and tending to urge the supporting member in the direction of the work engaging face 37 of the cutter.

Operating means are similar to that shown in Figure 1 and comprise plunger 38 acted upon by a rotating cam 39. The operation of this form is the same as previously described, namely the plunger 38 causing the supporting member 34 to turn about its pivot so as to engage the stock 40 and then further movement of the plunger causing the cutter and supporting member to move together so as to sever the stock.

In Figure 4 a slight modification is shown in which the cutter 41 has a forwardly projecting lug 42 to which is pivoted the supporting member 43 which in this case is in the form of a simple lever pivoted to the lug 42 intermediate its ends on a pivotal axis 44. Operation plunger 45 acts upon the upper part of the supporting member and the operation is as described for the construction in Figure 3.

The arrangement shown in Figure 5 is similar to that shown in Figure 3 except that the operating plunger 46 actuated by a cam 47 in this case acts upon an intermediate lever 48 which is pivoted to the sliding cutter 49 upon a pivotal axis 50. The cutter is mounted for rectilinear reciprocation in fixed guides 51 and has a lug 52 to which is pivoted supporting member 53 which is spring urged by a spring 54 towards the work engaging face 55 of the cutter.

In this arrangement the plunger 46 acts along the centre line of the operative portion of the cutter and this eliminates any tendency there might be to cause the cutter to pivot about its guides, as might be the case with an arrangement such as shown in Figure 3. The operation is as described for Figure 3 with the exception that the plunger 46 acts upon the intermediate lever 48 which bears at its upper end against the supporting member 53 so as to cause it to engage the work.

In all constructions, in order to allow the stock to be fed into position between the cutter and the supporting member, any suitable mechanism may be provided to cause the supporting member to open against the spring pressure at the end of the return movement, such as a fixed stop on the frame on the machine, which engages the supporting member at the end of the return movement and causes it to pivot and open outwardly.

One of the advantages of the construction forming the subject of the present invention is that the gripping force applied to the work by the supporting member is always proportional to the force with which the cutter engages the work. Thus where work of hard material is concerned and consequently heavy pressure is necessary to cut it, the pressure of the supporting member will also be heavy. On the other hand where the material of the work is relatively soft so that it can be cut without applying much force to the cutter, the pressure exerted on the work by the supporting member is proportionately less.

What we claim then is:

1. Severing means for severing stock fed axially through a die, comprising: a cutter movable in a plane perpendicular to said feeding axis, said cutter being movable into holding engagement with said stock; a supporting member pivotally connected to said cutting member and rotatable into holding engagement with said stock on a side thereof opposite to that engaged by said cutter for preventing bending of said stock during the severing thereof; and operating means for exerting a force on said supporting member directed along a line spaced from the rotational axis of said pivotal connection for causing rotation of said supporting member to engage said stock accompanied by severing movement of said cutter produced by action of said force on said pivotal connection.

2. Severing means according to claim 1, wherein said die is provided with a face and in which said cutter moves across said face in engagement therewith.

3. Severing means according to claim 2, further comprising supporting means for said die; and means pivotally connecting said cutter to said die supporting means for rotational movement in said plane.

4. Severing means according to claim 2, further comprising supporting means for said die; and means slidably connecting said cutter to said die supporting means for rectilinear movement in said plane.

5. Severing means according to claim 1, wherein said supporting member is in the form of an elongated bar, said pivotal connection being located intermediate its ends, said operating means exerting said force on one end portion thereof, the opposite end portion being engageable with said stock.

6. Severing means according to claim 1, further comprising spring means urging rotation of said supporting member into its stock engaging position.

ALFRED GEORGE BALLARD.
WILLIAM CARLYLE DENT.
DENNIS GEORGE BROSCOMB.
ALEXANDER BASIL WATT.

References Cited in the file of this patent

UNITED STATES PATENTS

| Number | Name | Date |
|---|---|---|
| 2,254,316 | Rider | Sept. 2, 1941 |